United States Patent [19]

Hsu

[11] Patent Number: 5,066,936
[45] Date of Patent: Nov. 19, 1991

[54] STRUCTURE OF PERMANENT MAGNETIC WORK HOLDER

[76] Inventor: P. J. Hsu, No. 5, Alley 1, Lane 250, Min Chuan East Road, Taipei, Taiwan

[21] Appl. No.: 658,618

[22] Filed: Feb. 21, 1991

[51] Int. Cl.⁵ .......................... H01F 7/04; H01F 7/20; B25B 11/00
[52] U.S. Cl. ........................ 335/295; 269/8; 335/285
[58] Field of Search ............... 335/295, 285, 286, 287, 335/288; 269/8

[56] References Cited

U.S. PATENT DOCUMENTS

| | | | |
|---|---|---|---|
| 3,010,054 | 11/1961 | Gouldsmit | 335/295 |
| 3,336,551 | 8/1967 | Stead | 335/295 |
| 4,023,267 | 5/1977 | Pignataro | 335/289 |
| 4,075,589 | 2/1978 | Braillon | 335/286 |
| 4,408,752 | 10/1983 | Uchikune et al. | 335/295 |
| 4,575,702 | 3/1986 | Nitta et al. | 335/286 |
| 4,663,602 | 5/1987 | Pignataro | 335/286 |

Primary Examiner—Leo P. Picard
Assistant Examiner—Ramon M. Barrera
Attorney, Agent, or Firm—Lowe, Price, LeBlanc & Becker

[57] ABSTRACT

A new structure of permanent magnetic sucker comprising a base, a magnet conductive disk, a sucker, a support plate spring, an operating lever and a cam, in which the base is made of light-weight aluminum alloy to minimize its weight and load to working bench, the base is designed with two pads to facilitate use of large electromagnetic sucker, the operative lever is fixed through a sleeve to prevent from being seized, and characterized by the application of fusion weld at high temperature for assembly of the magnetic conductive disk and the sucker without any fixing pin or frame.

1 Claim, 5 Drawing Sheets

STRUCTURE OF PERMANENT MAGNETIC WORK HOLDER

BACKGROUND OF THE INVENTION

The present invention related to a permanent magnetic work holder, or referred to hereinafter as a sucker, particularly a light-weight magnetic sucker with high strength and stability through application of fusion weld at high temperature for assembly of magnetic conductive disk and sucker in order to improve working efficiency and to prolong service life.

Conventionally permanent magnetic sucker is incorporated with a case iron base. Hence, it is quite heavy, working efficiency is limited, particularly where a large sucker is required. Prolonged use of such sucker would deteriorate machining precision. Moreover, the cam for its operating lever is made of steel which is designed to keep constant contact with the base. Such a design does not only make maintenance very difficult, and cause seizing of the operating lever at the base frequently. Seizing is always a trouble to its operator for its is very difficult to maintain the contact for it is inside the base. Furthermore, the sucker assembly of the prior art is formed by soldering, its bonding strength is weak, change of temperature can affect the levelness of the surface of the sucker, and consequently adversely affect the precision of machining.

In view of the above defects, the inventor has created a new structure of permanent magnetic sucker which makes use of aluminum alloy for making of the base to minimize its weight, two pads at the bottom of the base to facilitate use of large electromagnetic sucker, a copper alloy sleeve for the operating level to prevent from being seized, and fusion weld at high temperature for assembly of the magnetic conductive disk and sucker to eliminate impurities, to assure high bonding strength and stability for the highest possible machining precision.

SUMMARY OF THE INVENTION

The main objective of the present invention is to provide a new structure of permanent magnetic sucker comprising a base, a magnet conductive disk, a sucker, a support plate spring, an operating lever and a cam, in which the base is made of light-weight aluminum alloy to minimize its weight and load to working bench, the base is designed with two pads to facilitate use of large electromagnetic sucker, the operative lever is fixed through a sleeve to prevent from being seized, and characterized by the application of fusion weld at high temperature for assembly of the magnetic conductive disk and the sucker without any fixing pin or frame.

DETAILED DESCRIPTION OF THE PREFERRED EMBODIMENTS

Figure 1:
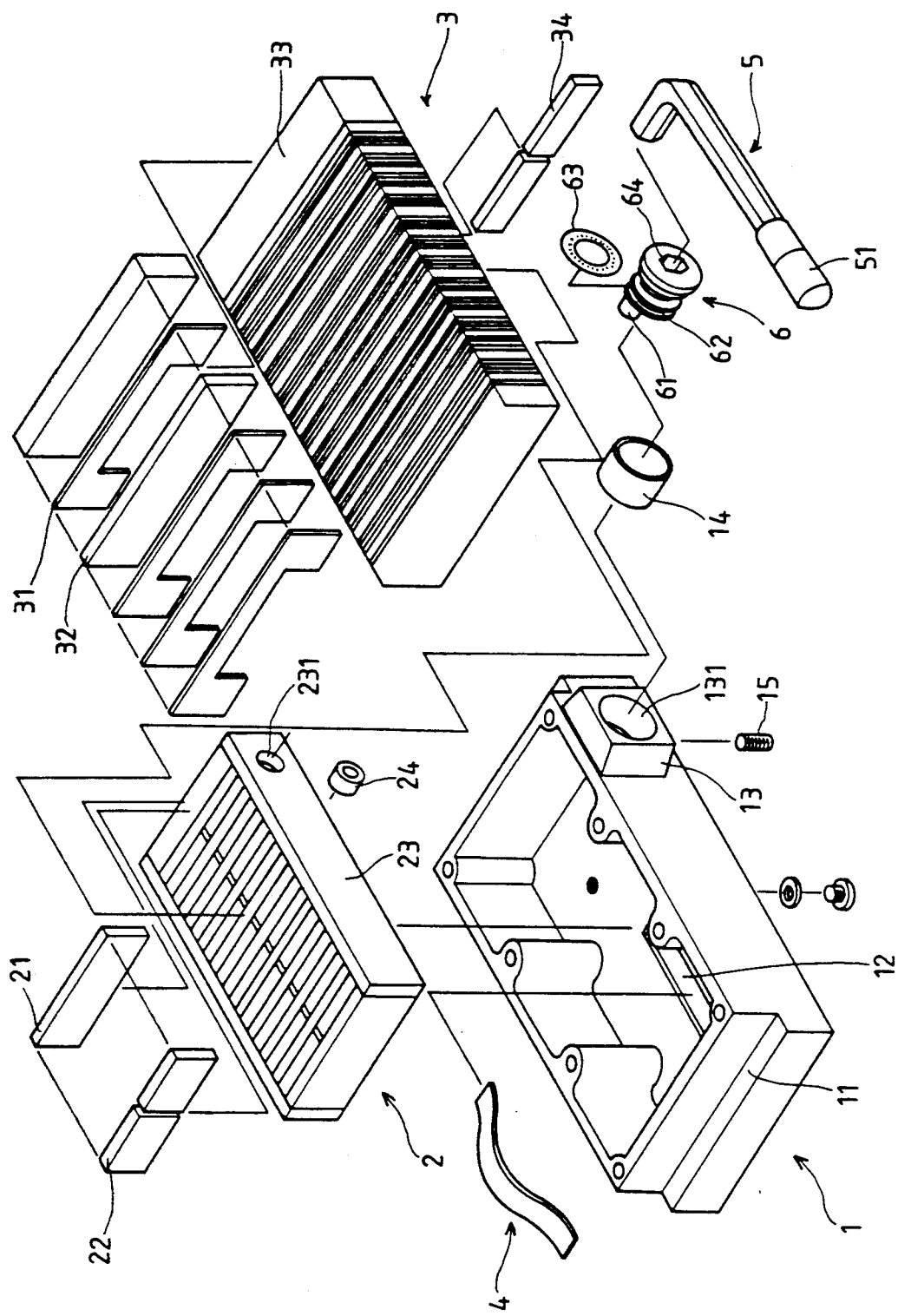
FIG. 1 is a fragmental prospective view of an embodiment according to the present invention.
Figure 4:
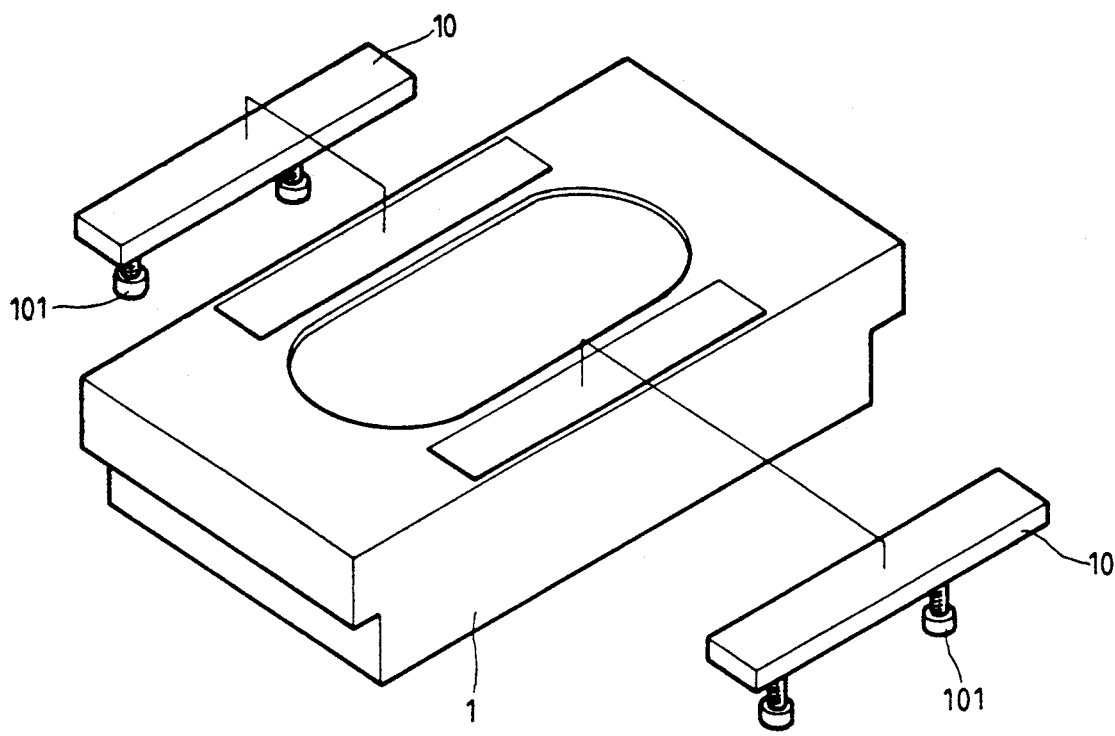
FIG. 4 illustrates the structure of the base according to the present invention.

As shown in FIG. 1, the present invention is comprised of a base (1), and induced magnetic disk (2), a sucker (3), a support plate spring (4), an operating lever (5), and a cam (6). The base (1) is made of light-weight aluminum alloy with two pads (10) at the bottom. Please refer to FIG. 4; bolts (101) are used to assure the adhesion of the pads (10) to the base (1), and two shoulder portions (11) are designed to help securing of the base on working bench. The base has a plate spring container (12) on the bottom, and a block (13) with a hole (131) for filling of a sleeve (14) at the front edge. Beneath the block (13) a fixing screw (15) for the operating lever (5) is fixed. The induced magnetic disk (2) is composed of a magnetic conductive plate (21) and a magnet (22) which are separated from each other, and secured by means of tin plate (23) at each end. A guide hole (231) is designed at the front side of the tin plate (23) for holding of a steel sleeve (24) to provide extra wear resistance capacity. The sucker (3) is composed of copper plate (31) and magnetic conductive plate (32) which are separated from each other, and secured by means of fixing board (33) at each side. The copper plate (31) is in the form of an U-plate having a recession to hold a magnet (34) to induce the magnet conductive plate (2). The support plate spring (4) is a plate spring. The operating lever (5) is a L-like lever with a cylindrical handle at the front end. The cam (6) has an eccentric shaft (61), a circular groove (62) for holding of an O-ring (63), and a hexagonal socket (64) on the end face.

Figure 2:
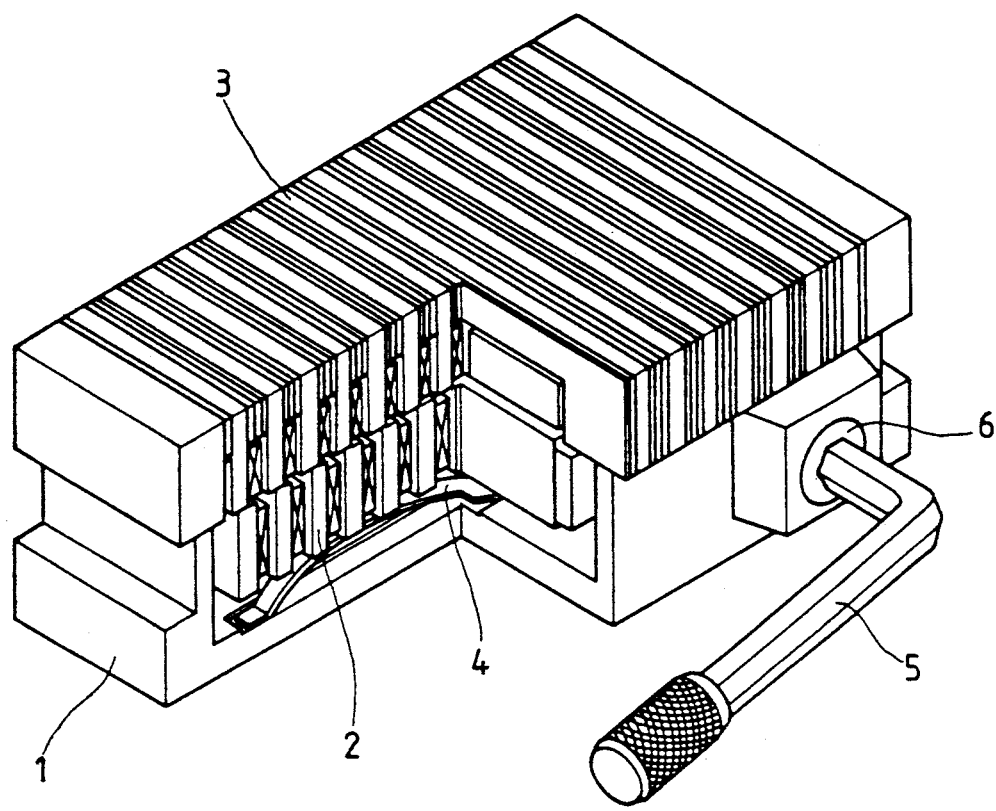
FIG. 2 is a prospective view of the embodiment according to the present invention.
Figure 3:
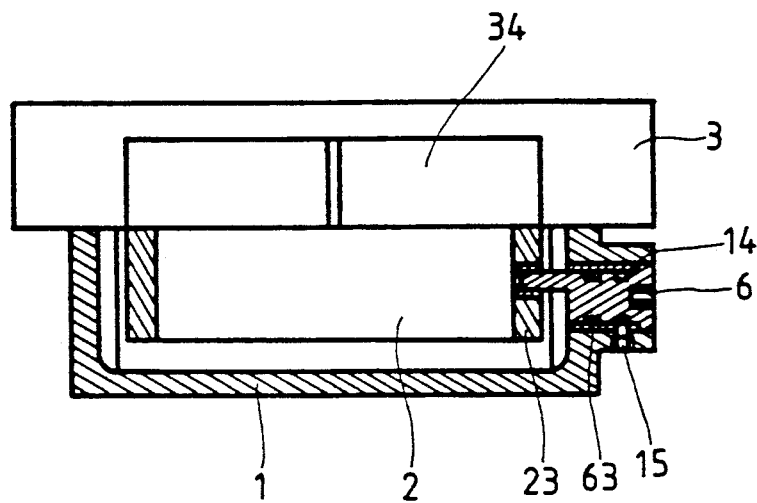
FIG. 3 is a cross sectional view of the embodiment according to the present invention.

In assembly of the present invention, the magnetic conductive disk (2) and the sucker (3) are assembled by fusion weld at high temperature. The support plate spring (4) is first placed within the plate spring container (12) of the base (1), and then the magnetic conductive disk (2) is placed in the base, the eccentric shaft (61) of the cam is turned and inserted into the guide hole (231) of the magnetic conductive disk (2), the sucker (3) is finally placed on the base (1) and fixed by means of screws to complete the assembly process. The operating lever (5) can be fixed to the cam (6), and can be removed from the cam (6) as well, as shown in FIG. 2.

By operation of the eccentric shaft (61), the magnetic conductive disk (2) is displaced leftwards or rightwards to turn on or off magnetic attraction from the sucker by induction between the magnet (22) in the magnetic conductive disk (2) and the magnet (34) in the sucker (3).

Figure 5:
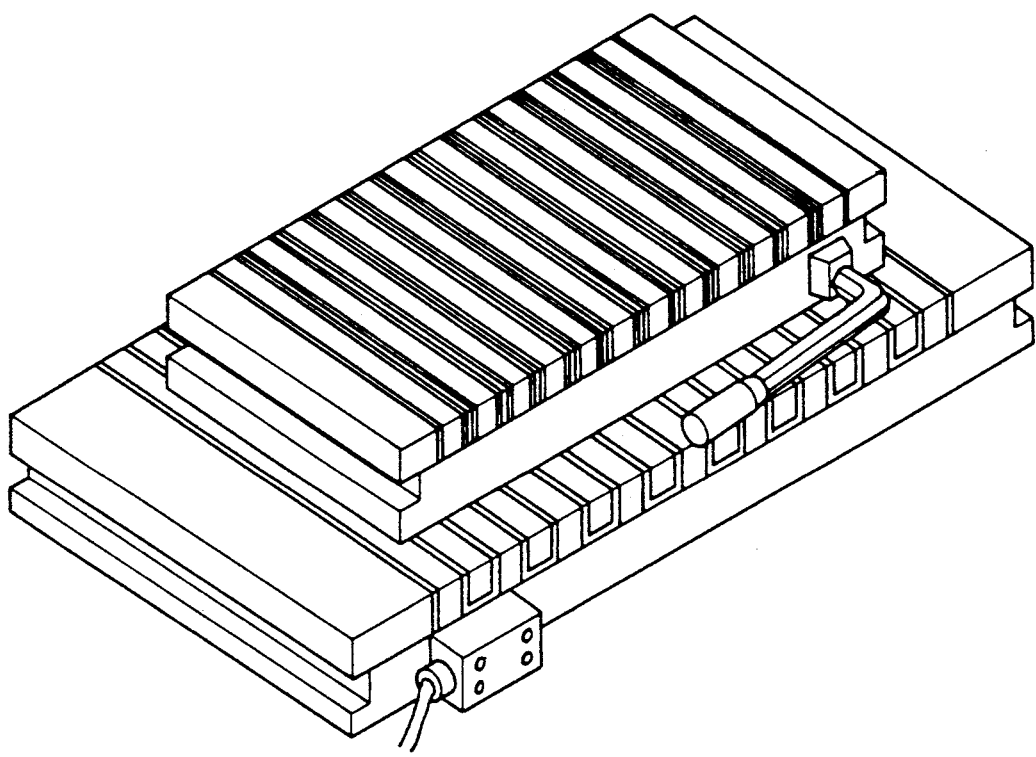
FIG. 5 illustrates the embodiment according to the present invention.

The present invention is characterized by the application of fusion weld at high temperature for assembly of the magnetic conductive disk (2) and the sucker (3) for tight and close bonding. Surface fusion occurs between the magnetic conductive plate (21) and the magnet (22), and between the copper plate (31) and the magnetic conductive plate (32) to provide a fine metallic texture so that highly stability and surface levelness can be assured. The present invention is further characterized by the use of aluminum alloy for making of the base which does not only minimize the weight of the sucker but also make its carriage very convenient, lower load to working bench, and permit placement of large electromagnetic sucker on the pads (10) to ease holding of working piece as shown in FIG. 5. At the socket for the operating lever (5) a sleeve is used to eliminate direct contact between the cam and the base to minimize wear of the cam. With such a design, only the sleeve has to be replaced after wearing, and the use of different materials for the sleeve and the cam can protect the operating lever from being seized.

I claim:

1. A new structure of permanent magnetic work holder comprising first and second sleeves, a base, a magnet conductive disk, a work holder, a support plate spring, an operating lever and a cam, in which the base is a light-weight aluminum alloy having two pads mounted on the bottom thereof, shoulder portions at each lateral side, a plate spring receiver at the bottom thereof, a block mounted thereon with a hole therein for receiving a first sleeve, at the front edge, and a set screw for securing the sleeve in the block; said magnetic conductive disk being composed of magnet conductive plate and magnet separated from each other and a tin plate having a guide hole for holding of a second sleeve and mounting said conductive plate and magnet; the holder being composed of a copper plate and a magnetic conductive plate which are separated from each other and a magnet, and a board mounting said plates at each side thereof, the copper plate being U-shaped and receiving the magnet between the legs thereof; the support plate spring being a plate spring received in said base; and the operating lever being L-shaped with cylindrical handle at the front end; the cam having an eccentric shaft, a circular groove to hold an O-ring, and a hexagonal socket on the end face; and characterized by the application of fusion weld at high temperature for assembly of the magnetic conductive disk and the holder, in which the support plate spring is first placed in the plate spring receiver in the base, the magnetic conductive disk, the eccentric shaft of the cam is turned and inserted into a second sleeve received in the guide hold in the magnetic conductive disk and tin plate, and the holder is mounted on the base, the pads on the base being made of aluminum alloy to facilitate use of the electromagnetic holder; and the first sleeve extending through the hole in the block on said base for holding the cam which in turn receives an end of the operating lever to eliminate the possibility of it being seized.

* * * * *